Dec. 6, 1949   S. BOCK   2,490,406
APPARATUS FOR TESTING ELECTRICAL DEVICES
Filed March 3, 1948
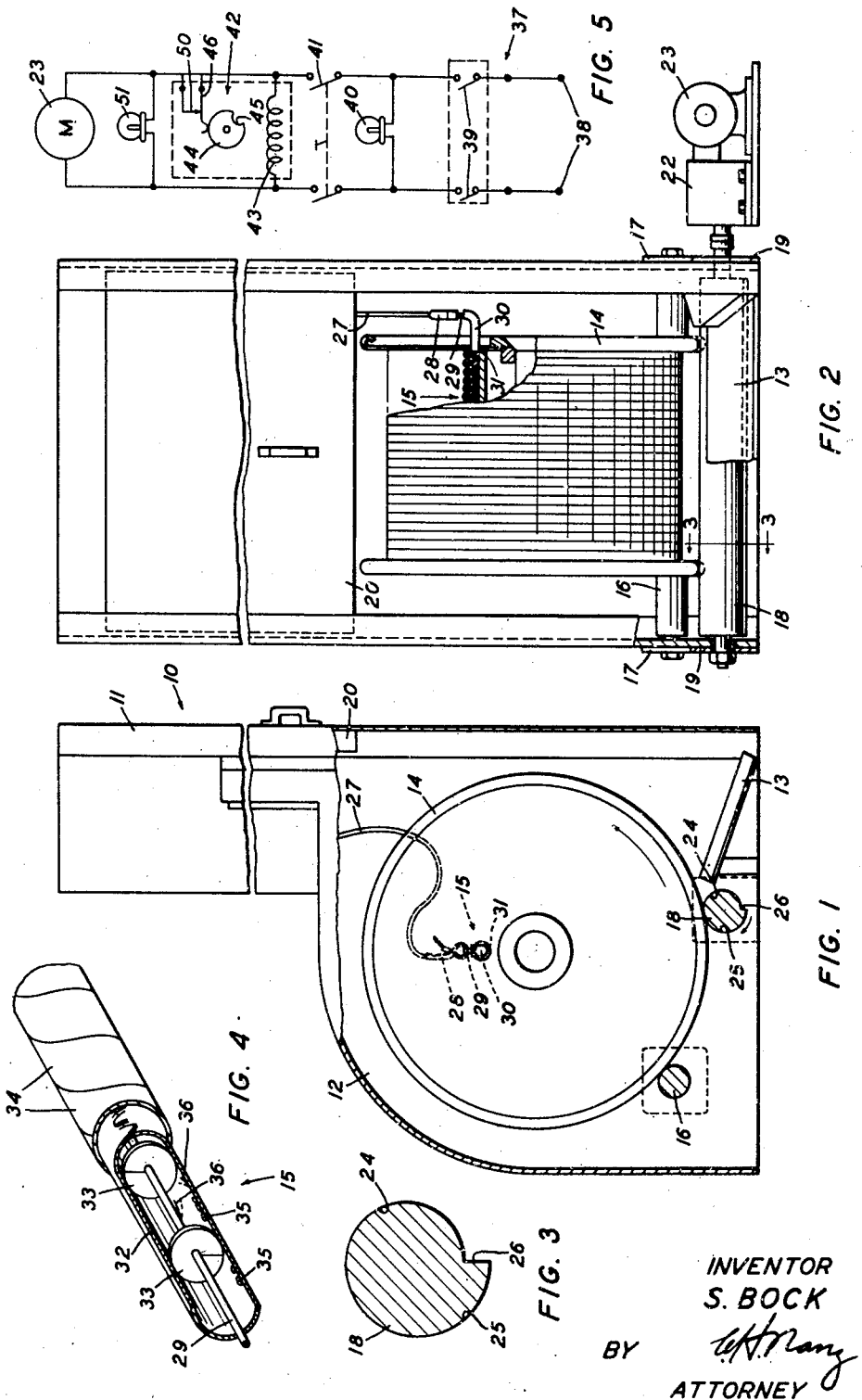
INVENTOR
S. BOCK
BY
ATTORNEY Patented Dec. 6, 1949

2,490,406

UNITED STATES PATENT OFFICE 2,490,406

APPARATUS FOR TESTING ELECTRICAL DEVICES

Sam Bock, Baltimore, Md., assignor to Western Electric Company, Incorporated, New York, N. Y., a corporation of New York Application March 3, 1948, Serial No. 12,716

2 Claims. (Cl. 219—11)

This invention relates to apparatus for testing electrical devices, and more particularly to apparatus for testing coaxial units used in the manufacture of coaxial cables.

One type of coaxial unit comprises a center conductor positioned coaxially within an outer tubular conductor by means of non-conductive discs spaced uniformly along the central conductor so as to leave an air dielectric therebetween, and flexible steel tape wound spirally around the tubular conductor.

In the manufacture of such coaxial units, various types of conductive faults which produce a path of reduced dielectric strength across the air dielectric between the central and tubular conductors have been frequently encountered. Generally, various electrical tests are applied to each coaxial unit to ascertain the presence of such faults in order that they may be removed from the unit. It was found, however, that the physical position of the coaxial unit affected the ability of the electrical tests to locate any conductive faults present in the conductor. For instance, it was found that a given length of coaxial unit wound on a reel would appear to be free of any faults for a given position of the reel, but would prove defective when the position of the reel was changed. It was further found that a coaxial unit, which had been tested and found satisfactory, would, upon subsequent handling of the reel, prove to have conductive faults therein when subjected to final electrical inspection.

An object of the invention is to provide new and improved apparatus for testing electrical devices.

Another object of the invention is to provide new and improved apparatus for rotating and jarring a given length of coaxial unit while the conductors of the unit are subjected to a high potential difference.

The invention contemplates the provision of an apparatus for testing a given length of coaxial unit, wherein the central and outer conductors of the coaxial unit are subjected to a high potential difference while the coaxial unit is simultaneously rotated and jarred to cause any conductive faults present in the unit to be positioned so as to produce a path of reduced dielectric strength between the central and outer conductors, whereby they may be detected.

A more complete understanding of the invention may be had from the following detailed description, when read in conjunction with the appended drawing, in which:

Fig. 1 is a side elevational view, partially in section, of a testing apparatus embodying features of the invention and by means of which methods embodying the invention may be practiced;

Fig. 2 is a front view of the apparatus shown in Fig. 1 having a portion thereof broken away for clarity;

Fig. 3 is an enlarged, fragmentary, sectional view taken along line 3—3 of Fig. 2;

Fig. 4 is an enlarged, fragmentary view of a coaxial unit to be tested by the methods and apparatus embodying the invention, and Fig. 5 illustrates diagrammatically an electrical control circuit for apparatus comprising the invention.

Referring now to the drawing, and more particularly to Fig. 1, a testing apparatus indicated generally by the numeral 10, comprises an upper compartment 11 and a reel compartment 12. The compartment 11 encloses various electrical instruments and apparatus for detecting and locating conductive faults that may be present in coaxial cable units. The electrical apparatus mounted in the compartment 11 and its associated circuits are fully disclosed and described in a copending application Serial No. 680,497, filed June 29, 1946, by R. D. Gambrill, now Patent No. 2,481,655, dated September 13, 1949. Since this testing apparatus forms no part of the present invention, it will be described only as fully as is necessary for a clear understanding of the invention.

The reel compartment 12 (Fig. 1) is provided with a ramp 13 at the base thereof, which enables a reel 14 containing a predetermined length of coaxial unit 15 to be rolled into the compartment 12 so that it rests on an idler roller 16 suitably journalled in bearings 17—17 (Fig. 2) secured to the opposite sides of the compartment 12 and on a roller 18 journalled in bearings 19—19 secured to the sides of the compartment. A door 20 which is slidably mounted in the test set 10, is shown in its uppermost position in Figs. 1 and 2, and may be lowered so as to close the reel compartment 12 while various testing operations are performed on the coaxial unit 15. The right hand end of the roller 18 (Fig. 2) extends beyond its associated bearing 19, and is coupled to a gear reducer 22, which in turn is connected to and driven by an electric motor 23. The roller 18 is provided with an eccentric periphery (Fig. 3) formed by a minor diameter periphery 24 and a major diameter periphery 25, arranged to form a continuous surface except for a radial shoulder 26, which joins the periphery 24 and the periphery 25.

When the reel 14 is positioned on rollers 16 and 18, as shown in Fig. 1, rotation of the roller 18 in the direction indicated by the arrow, will cause the reel to rotate about its central axis. During each complete revolution of the roller 18 the reel 14 will drop from the major periphery 25 to the minor periphery 24. By dropping the reel 14 in this manner the coaxial unit 15 wound on the reel is jarred sufficiently to cause any conductive particles within the coaxial unit to be jarred loose or be reoriented, so as to assume different positions in the air dielectric between the conductors of the coaxial unit.

A flexible test lead 27 (Figs. 1 and 2) has one end thereof connected to the electrical apparatus (not shown) positioned in the compartment 11. The other end of the lead 27 extends into the reel compartment 12 and is provided with a spring clip 28 by means of which it is connected to a center conductor 29 (Fig. 3) prepared to extend beyond the inner end of the coaxial unit 15. The inner end 30 of the coaxial unit 15 is extended through an opening 31 (Fig. 2) provided in the head of the reel 14 when the coaxial unit 15 is wound on the reel 14 in order that the inner end of the coaxial unit will be available for testing purposes. The center conductor 29 is positioned coaxially within an outer tubular conductor 32 by means of insulating discs 33—33 spaced uniformly along the conductor 29. The tubular conductor 32 has several flexible steel tapes 34—34 wound spirally therearound.

In the manufacture of coaxial units, such as the coaxial unit 15, various types of conductive faults may be present in the coaxial unit, which provide paths of reduced dielectric strength between the conductors thereof and thereby affect the intelligence transmission characteristics of the coaxial unit. The conductive fault may result from loose metallic particles 35—35 within the spaces between the discs 33—33 or hair-like slivers 36—36 attached to the central conductor 29 or the tubular conductor 32.

Referring now to Fig. 5, the motor 23 is connected by means of a two-wire circuit indicated generally at 37 across terminals 38—38 which may be connected to a suitable source of potential. The circuit 37 is provided with a pair of safety switches 39—39 arranged to be actuated into their closed positions when the door 20 is in its lowermost position across the opening of the reel compartment 12. A lamp 40 is connected across the circuit 34 to indicate when the door 20 is positioned across the opening of the reel compartment. A two pole, single throw switch 41 is provided for controlling the continuity of the circuit 37 between the lamp 40 and the motor 23.

A time delay relay 42 has its operating coil 43 connected across the circuit 34 so as to be energized when the switch 41 is closed. The operating coil 43 is arranged to actuate a cam 44, which is provided with a recess 45 for receiving the end of a resilient arm 46. The cam 44 normally maintains the resilient arm 46 in engagement with a stationary contact 50 connected directly to one terminal of the motor 23. A lamp 51 is connected across the portion of the circuit 37 controlled by the time delay relay 42, and serves to indicate when the arm 46 is in engagement with the contact 50 and likewise when the motor 23 is energized. When the switch 41 is closed, the operating coil 43, the lamp 51 and the motor 23 are simultaneously energized, whereupon the roller 18 is rotated to rotate the reel 14. The operating coil 43 of the relay 42 actuates the cam 44 so as to cause the arm 46 to be disengaged from the contact 50 after a predetermined period of time has elapsed, thereby terminating the operation of the motor 23.

Operation

The purpose of the electrical apparatus (not shown) mounted in the compartment 11, which is fully described in the aforementioned co-pending application, is to determine whether any of the above-described faults are present in the coaxial unit 15. The connection of the lead 27 to the center conductor 29 serves to connect the center conductor to one side of a high potential D. C. circuit embodied in the electrical apparatus. The opposite side of the high potential circuit is grounded, and since the tubular conductor 32 is grounded through its contact with the steel tapes 34—34 wound therearound and the reel 14, the high potential is applied across the conductors 29 and 32 and any fault positioned in the air dielectric therebetween.

If there are loose metallic particles, such as the particles 35—35, resting on the inside surface of the tubular conductor 32, their position may be such that they do not reduce the air gap between the conductors sufficiently to permit the high potential to break down the air dielectric between the particle and the center conductor and the presence of such particles would not be detected. Likewise, if the hair-like metallic slivers 36—36 were positioned substantially parallel to and close to the conductors 29 and 32 respectively, that is, their full line positions as shown in Fig. 4, they would not be detected by the high potential test. It is therefore necessary to change the position of the coaxial unit 15 to cause loose metallic particles, such as particles 35—35, to assume a position on the insulating discs 33—33, and to jar the coaxial unit 15 so as to cause the hair-like slivers 36—36 to assume their dotted line positions in the air dielectric, as shown in Fig. 4, while the high potential test is being applied across the conductors 29 and 32. By placing the loose particles 35—35 or the hair-like slivers 36—36 in their positions they will provide a path of substantially reduced dielectric strength between the conductors 29 and 32, which will break down under the stress of the high potential, and the presence of such faults will be indicated by the testing apparatus.

Assuming that the electrical testing apparatus (not shown) positioned in the compartment 11 of the testing apparatus 10 is properly energized and adjusted for testing coaxial units, such as the coaxial unit 15, the door 20 is raised to its uppermost position as shown in Figs. 1 and 2, which actuates the switches 39—39 to their open positions. A reel 14, which holds a predetermined length of coaxial unit 15 having its inner end 30 projecting through the opening 31 provided in the adjacent head of the reel 14, is rolled up the ramp 13 and positioned on the rollers 16 and 18 (Fig. 2). The spring clip 28 attached to the end of the lead 27 is clipped to the central conductor 29 extending beyond the inner end 30 of the coaxial unit 15, whereby the conductor 29 is connected to one side of the high D. C. potential testing circuit embodied in the electrical apparatus provided in the compartment 11. The tubular conductor 32 is connected to the grounded side of the testing circuit through its contact with the steel tapes 34—34 wound therearound and the reel 14. The lead 27 is of such length that it will permit the reel 14 to be rotated about its central axis without undue strain on the connection between the spring clip 28 and the central conductor 29.

The door 20 then is lowered so as to close the reel compartment 12, whereby the switches 39—39 are actuated to their closed positions. Closure of the switches 39—39 energizes the lamp 40 to indicate that the door is lowered and that the apparatus is in condition to permit further testing of the coaxial unit 15. Suitable switching means embodied in the electrical apparatus (not shown) positioned in the compartment 11 is actuated to impress a high potential across the conductors 29 and 32 and any faults, such as the particles 35—35 or slivers 36—36, which may be present in the coaxial unit 15. The two pole switch 41 then is actuated to its closed position, whereby the operating coil 43 of the time relay 42 is energized and starts its timing cycle on the cam 44. Since the cam 44 is in its starting position it maintains the resilient arm 46 in engagement with the contact 50 thereof and closure of the switch 41 places the motor 23 directly across the terminals 38—38 connected to a suitable potential source. The lamp 40 is also energized by the switch 41 to indicate that the motor 23 is operating.

The motor 23 drives the roller 18 through the gear reducer 22 in a clockwise direction (Fig. 1) at a predetermined rate of speed. This rotation of the roller 18 serves to rotate the reel 14 and the coaxial unit 15 wound thereon in a counterclockwise direction (Fig. 2) while the high potential is applied to the conductors 29 and 32. Upon each complete revolution of the roller 18 the coaxial unit 15 is jarred as the reel drops from the periphery 25 to the periphery 24 of the roller 18. The perimeter of the roller 18 is of such length that the roller must be rotated a plurality of revolutions in order to effect one complete revolution of the reel 14, whereby the coaxial unit is jarred a plurality of times during one complete revolution of the reel.

This rotating and jarring of the coaxial unit 15 serves to position the loose metallic particles 35—35 or any hair-like slivers, such as slivers 36—36 that may be present in the coaxial unit so that they will provide a path of substantially reduced dielectric strength between the center conductor 29 and the tubular conductor 32 of the coaxial unit. When such faults are so positioned within the coaxial unit a breakdown of the air dielectric of the unit will occur at the faults which indicates the presence of such faults in the coaxial unit as it is being rotated by the motor 23.

The motor 23 remains energized and continues to rotate and jar the coaxial unit 15 until the cam 44 of the time delay relay has been rotated to such a position that the end of the resilient arm 46 drops into the recess 45 of the cam. In so doing, the resilient arm 46 is disengaged from the stationary contact 50 and thereby opens the circuit 37 to the motor 23. This deenergizes the motor to terminate the rotation of the reel, and deenergizes the lamp 51, which indicates that the timing period has elapsed. The time delay relay 42 may be adjusted to provide an operating period for the motor which will effect the desired rotation and jarring of the reel 14 and the coaxial unit 15 carried thereby.

Let it be assumed that one complete revolution of the reel 14 and coaxial unit 15 is desired to be completed in one-half minute and that the reel is to be jarred fifty times during this period. The time delay relay 42 is then adjusted to delay opening the circuit 37 to the motor 23 for one-half minute, and the motor speed is adjusted to rotate the roller 18 fifty revolutions per one-half minute. In this case, the roller 18 is designed to have a periphery of such length that fifty revolutions of the roller will rotate the reel 14 one complete revolution. Under these conditions, while the reel 14 is being rotated through one revolution, it likewise is being jarred fifty times as it drops from the periphery 25 to the periphery 24 of the roller 18. One complete revolution of the coaxial unit will serve to position any loose metallic particles, such as the particles 35—35, therein so that a breakdown will occur in the coaxial unit at the point where the particles are positioned. Jarring the coaxial unit fifty times in one revolution thereof also will cause the hair-like slivers 36—36 to assume their dotted line positions, as shown in Fig. 4, and thereby cause a breakdown to occur thereat, which serves to indicate their presence in the coaxial unit.

If the coaxial unit 15 proves to be satisfactory while being rotated and vibrated the number of times permitted by a given setting of the time delay relay 42, the door 20 is lifted to its uppermost position, the lead 27 is disconnected from the central conductor 29 and the reel 14 is rolled out of the reel compartment 12 so that another reel containing a length of coaxial unit may be positioned therein. If the coaxial conductor 15 proves to be defective during the rotating and vibrating operation, other high potential testing operations are performed on the coaxial unit before the reel is removed from the reel compartment to burn out the faults and to locate the positions of faults which are not removed by the burn-out testing operation.

What is claimed is:

1. In a testing apparatus arranged to impress across the filamentary central conductor and the outer tubular conductor of a coaxial unit a D. C. potential having an intensity sufficient to break down any faults in the coaxial unit which provide paths of reduced dielectric strength between the conductors, the improvement which comprises a reel compartment in which a reel containing a coaxial unit which may be positioned, a cable suspended in the reel compartment for connecting the center conductor of the coaxial unit to the D. C. potential testing apparatus, an idler roller rotatably mounted near the base of the reel compartment, an eccentric roller rotatably mounted near the base of the reel compartment and spacedly positioned from the idler roller, said idler roller and eccentric roller coacting to rotatably support the reel in the reel compartment, said eccentric roller serving to jar the reel and coaxial unit carried thereby upon each revolution of the roller, and an electric motor provided for rotating the eccentric roller at a predetermined speed, whereby when the eccentric roller is rotated the coaxial unit is rotated and jarred thereby to cause any faults therein to be so positioned between the conductors of the coaxial unit that the potential difference between the conductors will break down the faults and indicate the presence of such faults in the coaxial unit.

2. In a testing apparatus arranged to impress across the filamentary central conductor and the outer tubular conductor of a coaxial unit a D. C. potential having an intensity sufficient to break down any faults which provide paths of reduced dielectric strength between the conductors, the improvement which comprises a reel compartment in which a reel containing a length of coaxial unit may be positioned, a flexible cable properly connected to the testing apparatus and suspended in the reel compartment for connecting the inner end of the central conductor of the coaxial unit to the testing apparatus and thereby impress the D. C. potential across the conductors of the coaxial unit, and idler roller rotatably mounted near the base of the reel compartment, an eccentric roller rotatably mounted near the base of the reel compartment, said idler roller and eccentric roller being spacedly positioned with respect to each other so as to rotatably support the reel above the base of the reel compartment, said eccentric roller serving to rotate and jar the coaxial unit carried on the reel upon each revolution of the roller, means for rotating the eccentric roller at a predetermined speed whereby the coaxial unit is rotated and jarred to cause any faults therein to be so positioned between the conductors that the potential difference between the conductors will break down the fault and indicate the presence of such faults in the coaxial unit, and timing means electrically connected to terminate the operation of the rotating means after the coaxial unit has been rotated and jarred a predetermined number of times.

SAM BOCK.

REFERENCES CITED

The following references are of record in the file of this patent:

UNITED STATES PATENTS

| Number | Name | Date |
|---|---|---|
| 1,882,815 | Haegele et al. | Oct. 18, 1932 |
| 1,904,598 | Anderson | Apr. 18, 1933 |
| 1,967,296 | Dixon et al. | July 24, 1934 |